No. 610,815. Patented Sept. 13, 1898.
C. E. LARAWAY.
NUT LOCK.
(Application filed May 4, 1898.)
(No Model.)

WITNESSES:
Donn Twitchell
Isaac Brewf

INVENTOR
C. E. Laraway.
BY
ATTORNEYS.

THE NORRIS PETERS CO., PHOTO-LITHO., WASHINGTON, D. C.

UNITED STATES PATENT OFFICE.

CULLEN EUGENE LARAWAY, OF PLAQUEMINE, LOUISIANA.

NUT-LOCK.

SPECIFICATION forming part of Letters Patent No. 610,815, dated September 13, 1898.

Application filed May 4, 1898. Serial No. 679,672. (No model.)

*To all whom it may concern:*

Be it known that I, CULLEN EUGENE LARAWAY, of Plaquemine, in the parish of Iberville and State of Louisiana, have invented a new and Improved Nut-Lock, of which the following is a full, clear, and exact description.

This invention is a nut-lock of that class in which the nut is held by a dog which engages with the bolt to prevent the turning of the nut; and the invention embodies a nut-casing carrying the dog and also carrying an eccentrically-bored collar which upon being turned independently of the casing throws the dog into engagement with the bolt.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1:
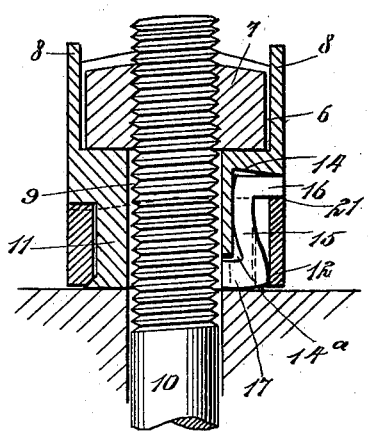
Figure 2:
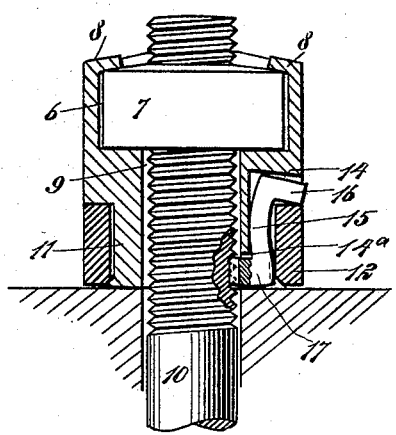
Figure 3:
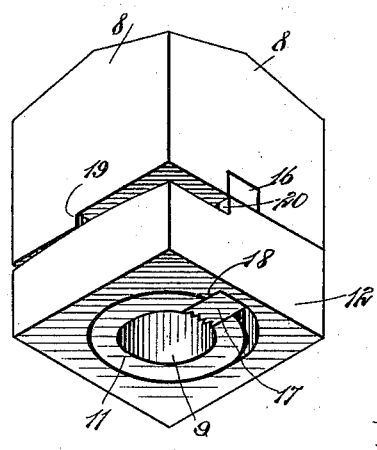
Figure 4:
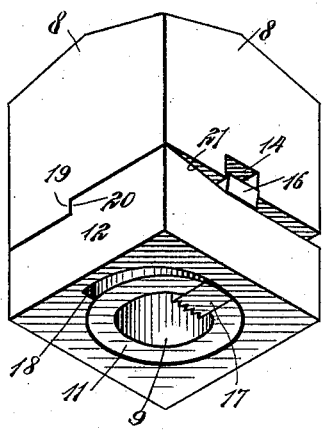
Figure 5:
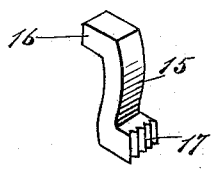

Figure 1 is a sectional view of the invention, showing the nut loosely seated in the casing. Fig. 2 is a similar view showing the nut immovably seated in the casing and also showing the locking-collar thrown to force the dog into engagement with the bolt. Fig. 3 is a perspective view of the nut-lock detached from the bolt. Fig. 4 is a similar view except that the dog and collar are shown in active position, and Fig. 5 is a perspective view of the dog separate from the other parts.

The invention is adapted to nuts of the usual form, and consequently may be applied to old machinery with comparative ease.

The nut-casing has angular walls and has a cavity 6 in its upper portion, in which the nut 7 is to be seated. The casing is constructed of malleable iron, and when the nut is in place the upper extremities 8 of the walls of the nut-casing are bent inward over the nut, as shown in Fig. 2, so as to hold the nut immovably seated in the casing. The nut-casing is provided with a central non-threaded bore 9, communicating with the cavity 6, through which bore the bolt 10 passes. The bolt 10 also passes through the cavity 6 and through the nut 7 to be engaged with the screw-threads of the latter. The lower portion of the nut-casing is reduced to form a neck 11, revolubly carrying an angular locking-collar 12, the lower end of the neck being upset to hold the collar in place. A recess 14 is formed in the nut-casing below the cavity 6, such recess being extended downward longitudinally in the neck 11 and having its lower portion 14ª increased in depth, so as to communicate with the bore 9 of the nut-casing. In this recess 14 is located a dog which has a main portion or shank 15 running longitudinally in the recess 14 and having at its upper end an outwardly-extended arm 16, projecting over and engaging the upper edge of the locking-collar 12. The lower end of the dog has an inwardly-extended arm 17 projecting through the lower end 14ª of the recess 14, so as to engage with the threads of the bolt, as shown in Fig. 2. The inner end of the arm 17 has teeth thereon to insure an effective engagement.

The locking-collar 12 has an eccentric bore receiving the neck 11 and forming a radial shoulder 18, from which the wall of the bore curves inwardly toward the center of the nut for approximately a quarter circumference of the bore, at which point the said wall merges into the concentric portion of the bore. When the shoulder 18 lies alongside of the arm 17 of the dog, as shown in Fig. 3, the lower portion of the dog may be moved outward so as to disengage the bolt; but when the collar 12 is turned around to the position shown in Fig. 4—which is to say, a position that removes the shoulder 18 and its attendant eccentric wall from the dog—the dog is thrown in by engagement with the concentric walls of the bore in the locking-collar 12, so that the arm 17 is made to engage with the bolt. The nut-casing 8 is provided at the upper end of the neck 11 with a shoulder 19, adapted to coact with a shoulder 20, formed on the upper face of the locking-collar 12. These shoulders limit the movement of the locking-collar to the position shown in Fig. 4, while the engagement of the shoulder 18 with the dog limits the movement of the collar 12 in the opposite direction to the position shown in Fig. 3. It is thus that the locking-collar 12 is mounted on the neck 11, so as to have independent movement through one-quarter of a revolution. For throwing the dog into inactive position, as shown in Fig. 3, the upper face of the collar 12 is formed with an inclined surface 21, which engages the under side of the arm 16 of the dog. Therefore as the collar 12 is turned from the position shown in Fig. 3 to that shown in Fig. 4 the inclined wall of the bore of the collar 12, adjacent to the shoulder 18, rides over the lower portion of the dog and throws the arm 17 into engagement with the bolt. When the collar 12 is moved in the opposite direction, the shoulder 18 turns toward the arm 17 of the dog, so as to permit the outward movement of the lower end of the dog, while the inclined surface 21 of the collar 12 rides beneath the arm 16 of the dog, throwing said arm upward and retracting the arm 17.

The nut-lock is used by placing the nut in the casing and securing it therein by bending down the parts 8 of the walls of the casing. The dog and locking-collar are now placed in position and the whole device is screwed onto the bolt, as shown in Figs. 1 and 2. When the nut has been screwed home, the nut is locked by throwing the collar 12 to the position shown in Figs. 2 and 4, thus forcing the teeth of the arm 17 into engagement with the threads of the bolt and rendering the displacement of the nut impossible until the locking-collar is returned to the position shown in Figs. 1 and 3, whereupon the inclined surface 21 of the locking-collar acts to force the dog back to inactive position.

Having thus described my invention, I claim as new and desire to secure by Letters Patent—

1. The combination of a nut-casing having a neck thereon and having a recess in the neck, a dog mounted loosely in the recess, and a locking-collar mounted to turn on the neck and having an inclined surface engaging the dog to throw the same.

2. The combination of a nut-casing, a dog mounted thereon, and a collar capable of turning loosely on the casing, the collar engaging the dog to throw the same to active and inactive positions.

3. The combination of a member capable of connection with a nut, a dog mounted on the member and capable of engaging a bolt to lock the nut, and a locking-collar turning on said member and engaging the dog to throw the same to active and inactive positions.

4. The combination of a nut-casing having a cavity capable of receiving a nut and holding the same immovable with reference to said casing, a dog mounted loosely in the casing, and a locking-collar mounted to turn on the casing and engaging the dog to throw the same into active and inactive positions.

5. The combination of a member capable of fast connection with a nut, a dog carried by said member and capable of engaging and disengaging a bolt, and a collar mounted to turn on said member and having two inclined surfaces acting on the dog, the one serving to throw the dog to engage the nut, and the other serving to retract the dog.

CULLEN EUGENE LARAWAY.

Witnesses:
T. W. DARDEUX,
JAS. M. RHORER, Jr.